(12) United States Patent
Shen

(10) Patent No.: US 12,224,544 B2
(45) Date of Patent: Feb. 11, 2025

(54) CLAMPING PLIER

(71) Applicants: ZHUJI ITOP HARDWARE TOOLS CO., LTD., Zhuji (CN); ZHEJIANG IWISS ELECTRIC CO., LTD., Leqing (CN)

(72) Inventor: Yuejuan Shen, Zhuji (CN)

(73) Assignees: Zhejiang Iwiss Electric Co., Ltd., Yueqing (CN); Zhuji Itop Hardware Tools Co., Ltd., Shaoxing (CN)

( * ) Notice: Subject to any disclaimer, the term of this patent is extended or adjusted under 35 U.S.C. 154(b) by 353 days.

(21) Appl. No.: 17/652,397

(22) Filed: Feb. 24, 2022

(65) Prior Publication Data

US 2023/0198213 A1 Jun. 22, 2023

(30) Foreign Application Priority Data

Dec. 21, 2021 (CN) .......................... 202123230949.5

(51) Int. Cl.
*H01R 43/042* (2006.01)
*H02G 1/00* (2006.01)
*H02G 1/12* (2006.01)

(52) U.S. Cl.
CPC ......... *H01R 43/0421* (2013.01); *H02G 1/005* (2013.01); *H02G 1/1236* (2013.01)

(58) Field of Classification Search
CPC ... H01R 43/0421; H02G 1/005; H02G 1/1236
USPC .................................. 7/107; 81/352, 9.3, 9.4
See application file for complete search history.

(56) References Cited

U.S. PATENT DOCUMENTS

| | | | | |
|---|---|---|---|---|
| 188,408 A * | 3/1877 | Quirk | ..................... | A47L 9/1608 81/352 |
| 1,546,355 A * | 7/1925 | Anderson | ................ | A61C 3/14 433/160 |
| 1,924,837 A * | 8/1933 | Crause | ................. | H02G 1/1214 30/90.1 |
| 5,483,732 A * | 1/1996 | Wang | ..................... | B25B 27/205 81/424 |
| 6,131,495 A * | 10/2000 | Chen | ......................... | B25B 7/00 81/416 |
| 6,684,439 B2 * | 2/2004 | Jeske | .................... | H02G 1/1214 7/127 |

\* cited by examiner

*Primary Examiner* — Hadi Shakeri
(74) *Attorney, Agent, or Firm* — Schwegman Lundberg & Woessner, P.A.

(57) ABSTRACT

A clamping plier is disclosed, including a first and a second plier bodies. The first and the second plier bodies are connected together through a shaft, an elastic member is provided on the shaft. The first plier body includes a first handle and a first jaw and the second plier body includes a second handle and a second jaw. The first jaw is provided with a first clamping head and a first cable stripping head, and the second jaw is provided with a second clamping head and a second cable stripping head. The first crimping head and the second crimping head cooperate to form a terminal crimping position, the first and the second cable stripping heads cooperate to form a cable cutting and stripping position. The elastic member is connected between the first and the second crimping heads or between the first and the second cable stripping heads.

16 Claims, 2 Drawing Sheets

CLAMPING PLIER

CROSS-REFERENCE TO RELATED APPLICATIONS

This Non-provisional application claims priority under 35 U.S.C. § 119(a) to Chinese Patent Application No. 202123230949.5, filed on 21 Dec. 2021, the entire contents of which are hereby incorporated by reference in its entirety.

TECHNICAL FIELD

The disclosure relates to a technical field of electric power tools, in particular to a multifunctional clamping plier.

BACKGROUND ART

In terminal crimping, it is necessary to operate at site and it is very inconvenient to carry large terminal crimping devices. Currently, there are small terminal crimping devices emerge on the market, such as a manual terminal clamping plier and a rechargeable terminal clamping plier, in order to accomplish the terminal crimping easily and quickly.

A clamping plier is a necessary tool for wire connection and crimping in line infrastructure construction and line maintenance in an electric power industry, which is used to connect a terminal to a wire end. One of characteristics of this small-sized terminal crimping plier is that each plier can only crimp terminals; but in fact, when the terminals are crimped, it is necessary to cut and strip the cable before crimping the terminals, so it is necessary to carry several cable cutting or stripping tools.

SUMMARY

To solve the above problems, the technical scheme provided in the disclosure is as follows:

A clamping plier includes a first plier body and a second plier body. The first plier body and the second plier body are connected together through a shaft, an elastic member is provided on the shaft. The first plier body includes a first handle and a first jaw and the second plier body includes a second handle and a second jaw. The first jaw is provided with a first clamping head and a first cable stripping head, and the second jaw is provided with a second clamping head and a second cable stripping head. The first crimping head and the second crimping head cooperate to form a terminal crimping position, the first cable stripping head and the second cable stripping head cooperate to form a cable cutting and stripping position. The elastic member is connected between the first crimping head and the second crimping head or between the first cable stripping head and the second cable stripping head.

It is further provided in the disclosure that the first jaw is provided with a first connecting shaft, which is inserted into the first crimping head and the first cable stripping head, and the second jaw is provided with a second connecting shaft, which is inserted into the second crimping head and the second cable stripping head.

It is further provided in the disclosure that the first crimping head and the first cable stripping head are fixed by a first connecting pillar, and the second crimping head and the second cable stripping head are fixed by a second connecting pillar. The first crimping head and the first cable stripping head are fixed together by the first fixing pillar and the first connecting shaft, and the second crimping head and the second cable stripping head are fixed together by the second fixing pillar and the second connecting shaft, so that actions of the first crimping head and the first cable stripping head are consistent, and actions of the second crimping head and the second cable stripping head are consistent.

It is further provided in the disclosure that the first plier body is provided with a first limiting post, the first clamping head is provided with a first limiting groove, the second plier body is provided with a second limiting post, the second clamping head is provided with a second limiting groove. The first limiting post is connected in the second limiting groove, and the second limiting post is connected in the first limiting groove. Cooperation of the limiting groove and the limiting post makes the first jaw and the second jaw have a fixed opening when they are opened.

It is further provided in the disclosure that the first plier body or the second plier body is provided with a locking member, which is movably connected to the first plier body or the second plier body through a locking shaft, and the second plier body or the first plier body is provided with a locking aperture, and the locking aperture and the locking member are oppositely arranged. The locking member can be matched with the locking aperture, so that the first plier body and the second plier body are in a locked state.

It is further provided in the disclosure that relative locations of the shaft, the cable cutting and stripping position and the terminal crimping position are kept fixed, the cable cutting and stripping position is arranged proximate to the shaft, and the terminal crimping position is arranged away from the shaft. The terminal crimping position is set away from the shaft, which reduces a force applied when the terminal is crimped and saves effort.

It is further provided in the disclosure that both the first cable stripping head and the second cable stripping head are provided with a cutting area and a cable stripping area.

It is further provided in the disclosure that the first crimping head and the second crimping head are both provided with a crimping area.

It is further provided in the disclosure that the first handle and the second handle are both provided with an insulating handle.

It is further provided in the disclosure that the elastic member is a torsion spring.

Compared with the prior art, the technical schemes provided in the disclosure have the following beneficial effects:

According to the technical scheme, the crimping head and the cable stripping head are integrated on the jaws, so that the crimping plier have functions of terminal crimping and cable stripping at the same time; when the crimping plier acts, the crimping head and the cable stripping head both act synchronously with a respective plier body, with a stable and reliable action and no other pliers required in actual wiring operations, and with usage flexibility and high working efficiency.

DETAILED DESCRIPTION

In order to further understand contents of the present disclosure, the present disclosure will be described in detail with reference to drawings and examples.

In description of this disclosure, it should be noted that unless otherwise specified and limited, terms "installing", "coupling" and "connecting" should be understood broadly, for example, it can be "fixedly connecting", "integrally connecting", or "detachably connecting"; or it can be "mechanically connecting" or "electrically connecting", or it can be "communicating within two elements"; or it can be "directly connecting" or "indirectly connecting through an intermediate medium", and specific meanings of the above terms can be understood according to specific situations for ordinary shilled in the art.

Figure 1:
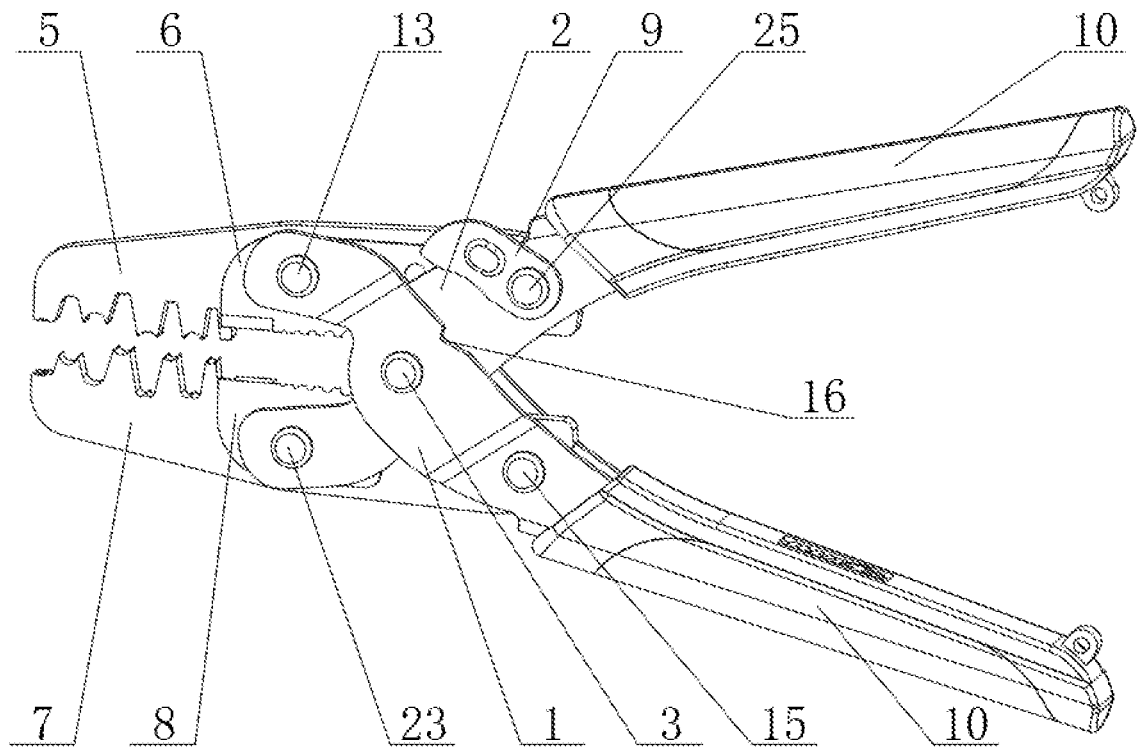
FIG. 1 is a perspective view of a clamping plier in an unlocked state according to an embodiment of the disclosure.
Figure 2:
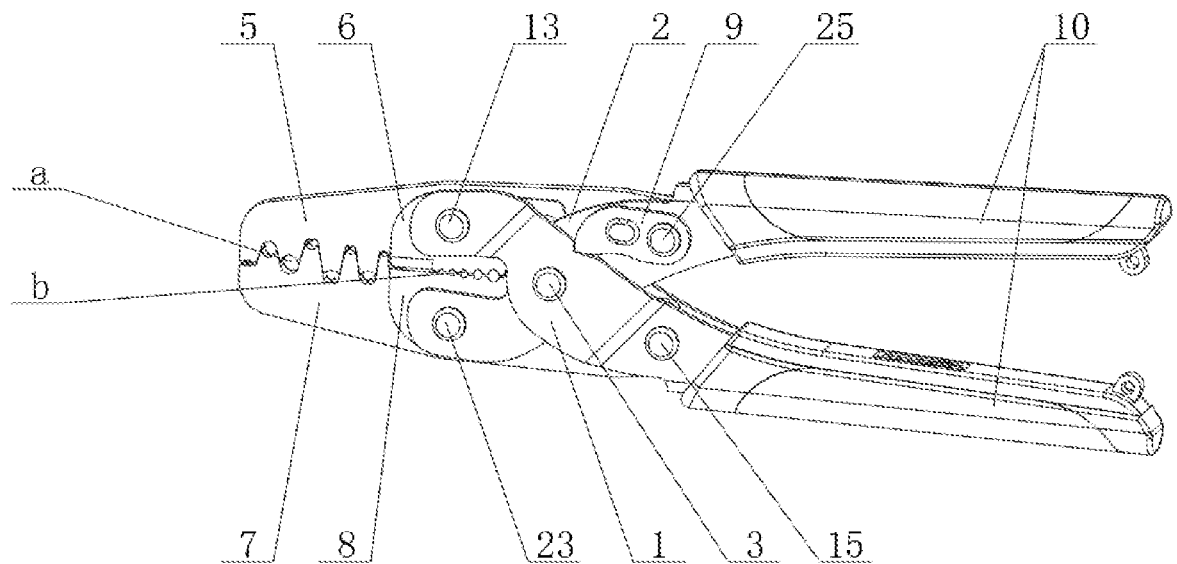
FIG. 2 is a perspective view of a clamping plier in a locked state according to an embodiment of the disclosure.
Figure 3:
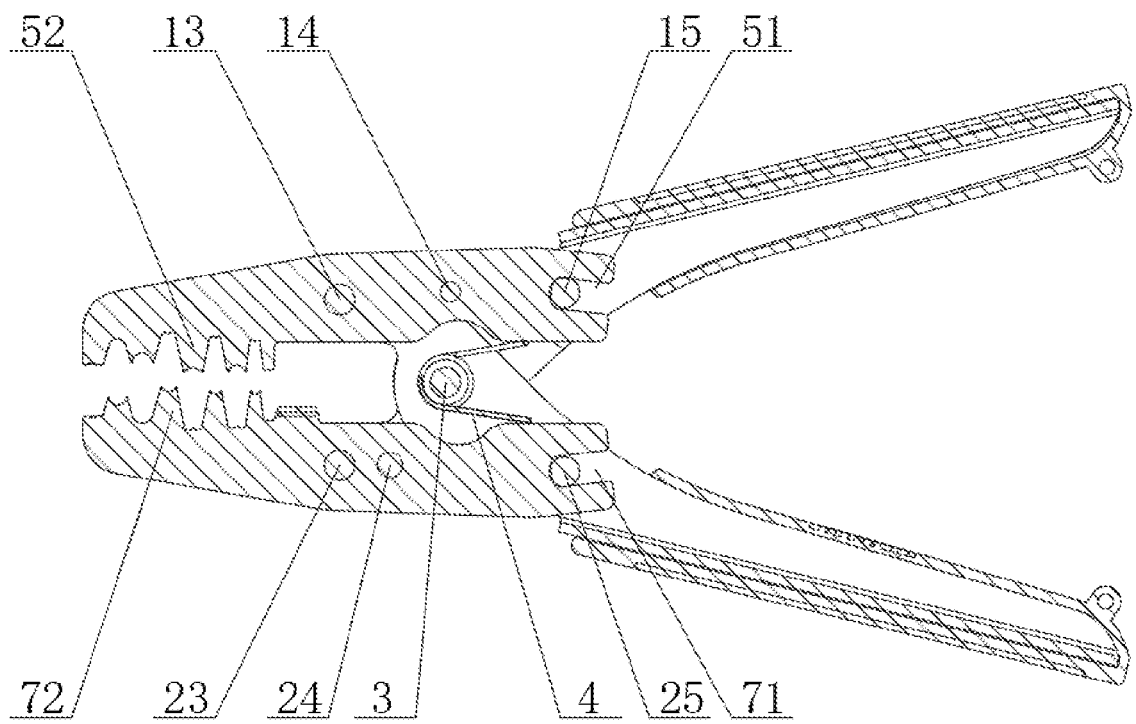
FIG. 3 is a sectional view of a clamping plier according to an embodiment of the disclosure.
Figure 4:
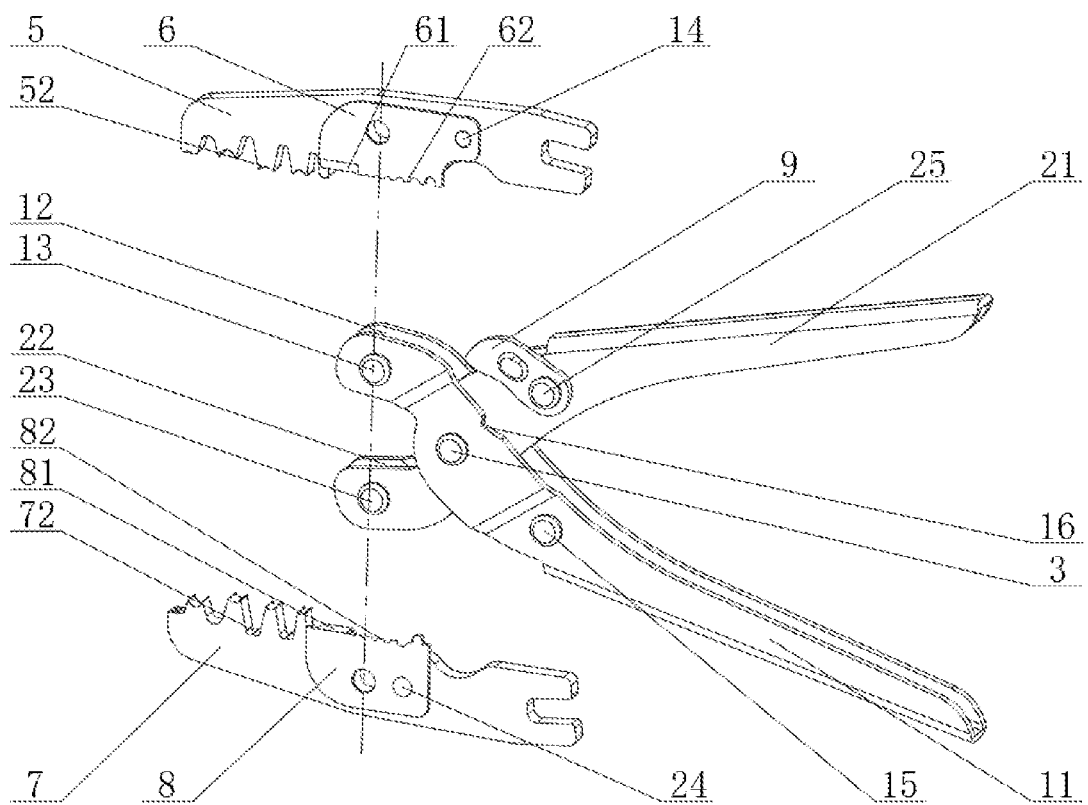
FIG. 4 is an exploded view of a clamping plier according to an embodiment of the disclosure.

With reference to FIGS. 1 to 4, a technical scheme of the disclosure is a clamping plier, which includes a first plier body 1 and a second plier body 2, which are cross-connected together through a shaft 3, and an elastic member 4 is provided on the shaft 3. The first plier body 1 includes a first handle 11 and a first jaw 12 and the second plier body 2 includes a second handle 21 and a second jaw 22. The first jaw 12 is provided with a first clamping head 5 and a first cable stripping head 6, and the second jaw 22 is provided with a second clamping head 7 and a second cable stripping head 8. The first crimping head 5 and the second crimping head 7 cooperate to form a terminal crimping position a, the first cable stripping head 6 and the second cable stripping head 8 cooperate to form a cable cutting and stripping position b. The elastic member 4 is connected between the first crimping head 5 and the second crimping head 7. The elastic member 4 drives the first crimping head 5 and the second crimping head 7 to open, the first jaw 12 is provided with a first connecting shaft 13, which is inserted into the first crimping head 5 and the first cable stripping head 6, and the second jaw 22 is provided with a second connecting shaft 23, which is inserted into the second crimping head 7 and the second cable stripping head 8. The first crimping head 5 and the first cable stripping head 6 are fixed by a first connecting pillar 14, and the second crimping head 7 and the second cable stripping head 8 are fixed by a second connecting pillar 24. The first handle 11 and the second handle 21 are both provided with an insulating handle 10.

The first connecting shaft 13 and the first connecting post 14 are respectively located at both ends of the first cable stripping head 6, and the second connecting shaft 23 and the second connecting post 24 are respectively located at both ends of the second cable stripping head 8.

In this embodiment, the first plier body 1 is provided with a first limiting post 15, the second plier body 2 is provided with a second limiting post 25, the first clamping head 5 is provided with a first limiting groove 51, and the second clamping head 7 is provided with a second limiting groove 71. The first limiting post 15 is connected in the second limiting groove 71, and the second limiting post 25 is connected in the first limiting groove 51.

In this embodiment, the second plier body 2 is provided with a locking member 9, which is movably connected to the second plier body 2 through a locking shaft, and the first plier body 1 is provided with a locking opening 16, the locking aperture 16 and the locking member 9 are oppositely arranged, and the locking shaft can be a second limiting post 25. In other embodiments, the locking member 9 can be connected to the first limiting post 15, and the locking aperture 16 is provided on the second plier body 2.

In this embodiment, relative locations of the shaft 3, the cable cutting and stripping position b and the terminal crimping position a are kept fixed, the cable cutting and stripping position b is arranged proximate to the shaft 3, and the terminal crimping position a is arranged away from the shaft 3.

In this embodiment, the first cable stripping head 6 is provided with a first cable cutting area 61 and a first cable stripping area 62, and the second cable stripping head 8 is provided with a second cable cutting area 81 and a second cable stripping area 82. The first cable cutting area 61 and the second cable cutting area 81 can be arranged proximate to the shaft 3, and the first cable stripping area 62 and the second cable stripping area 82 are arranged away from the shaft 3. In other embodiments, the first cable stripping area 62 and the second cable stripping area 82 can also be arranged proximate to the shaft 3 and the first cable cutting area 61 and the second cable cutting area 81 are arranged away from the shaft, the first cable cutting area 61 and the second cable cutting area 81 cooperate to realize a cable cutting function, and the first cable stripping area 62 and the second cable stripping area 82 cooperate to realize a cable stripping function.

In this embodiment, a first crimping area 52 is provided on the first crimping jaw 5, and a second crimping area 72 is provided on the second crimping jaw 7. The first crimping area 52 and the second crimping area 72 crossly cooperate to form the terminal crimping position a and realize the crimping function.

In this embodiment, the elastic member 4 is a torsion spring or other elastic members, such as a compression spring.

The present disclosure and embodiments thereof are described above in an illustrative manner, which is not restrictive; and what is shown in the drawings is only one of the embodiments of the present disclosure, and its actual structure is not limited thereto. Therefore, structures and embodiments similar to the technical scheme designed by those of ordinary skills in the art inspired by this disclosure without creativity, without departing from the creative purpose of the present disclosure, are all within a protection scope of the present disclosure.

What is claimed is:

1. A clamping plier, comprising a first plier body and a second plier body, wherein the first plier body and the second plier body are connected together through a shaft, an elastic member is provided on the shaft; the first plier body comprises a first handle and a first jaw and the second plier body comprises a second handle and a second jaw, the first jaw is provided with a first clamping head and a first cable stripping head, and the second jaw is provided with a second clamping head and a second cable stripping head; the first crimping head and the second crimping head cooperate to form a terminal crimping position, the first cable stripping head and the second cable stripping head cooperate to form a cable cutting and stripping position; and the elastic member is connected between the first crimping head and the second crimping head or between the first cable stripping head and the second cable stripping head;

wherein relative locations of the shaft, the cable cutting and stripping position and the terminal crimping position are kept fixed, the cable cutting and stripping position is arranged proximate to the shaft, and the terminal crimping position is arranged away from the shaft;

wherein the first cable stripping head and the second cable stripping head are respectively provided with a first cutting area and a second cutting area, the first cable stripping head and the second cable stripping head are respectively provided with a first cable stripping area and a second cable stripping area, and the first cutting area and a second cutting area are cooperate to realize a cable cutting function, the first cable stripping area and the second cable stripping area cooperate to realize a cable stripping function;

wherein a first crimping area is provided on the first crimping head, and a second crimping area is provided on the second crimping head, and the first crimping area and the second crimping area crossly cooperate to realize a crimping function;

wherein the first cable stripping head is attached to one side of the first crimping head, the second cable stripping head is attached to one side of the second crimping head, and the first cable stripping head and the second cable stripping head are located on the same side of the first crimping head and the second crimping head; wherein the first cable stripping head and the first crimping head are two independent heads, and the second cable stripping head and the second crimping head are two independent heads.

2. The clamping plier according to claim 1, wherein the first jaw is provided with a first connecting shaft, the first connecting shaft is inserted into the first crimping head and the first cable stripping head; and the second jaw is provided with a second connecting shaft, the second connecting shaft is inserted into the second crimping head and the second cable stripping head.

3. The clamping plier according to claim 2, wherein the first plier body or the second plier body is provided with a locking member, which is movably connected to the first plier body or the second plier body through a locking shaft, and the second plier body or the first plier body is provided with a locking aperture, the locking aperture and the locking member being oppositely arranged.

4. The clamping plier according to claim 2, wherein relative locations of the shaft, the cable cutting and stripping position and the terminal crimping position are kept fixed, the cable cutting and stripping position is arranged proximate to the shaft, and the terminal crimping position is arranged away from the shaft.

5. The clamping plier according to claim 2, wherein the first crimping head and the first cable stripping head are fixed by a first connecting pillar, and the second crimping head and the second cable stripping head are fixed by a second connecting pillar.

6. The clamping plier according to claim 5, wherein the first plier body or the second plier body is provided with a locking member, which is movably connected to the first plier body or the second plier body through a locking shaft, and the second plier body or the first plier body is provided with a locking aperture, the locking aperture and the locking member being oppositely arranged.

7. The clamping plier according to claim 5, wherein relative locations of the shaft, the cable cutting and stripping position and the terminal crimping position are kept fixed, the cable cutting and stripping position is arranged proximate to the shaft, and the terminal crimping position is arranged away from the shaft.

8. The clamping plier according to claim 5, wherein the first plier body is provided with a first limiting post, the first clamping head is provided with a first limiting groove, the second plier body is provided with a second limiting post, and the second clamping head is provided with a second limiting groove, the first limiting post being connected in the second limiting groove and the second limiting post being connected in the first limiting groove.

9. The clamping plier according to claim 8, wherein the first plier body or the second plier body is provided with a locking member, which is movably connected to the first plier body or the second plier body through a locking shaft, and the second plier body or the first plier body is provided with a locking aperture, the locking aperture and the locking member being oppositely arranged.

10. The clamping plier according to claim 8, wherein relative locations of the shaft, the cable cutting and stripping position and the terminal crimping position are kept fixed, the cable cutting and stripping position is arranged proximate to the shaft, and the terminal crimping position is arranged away from the shaft.

11. The clamping plier according to claim 1, wherein the first plier body or the second plier body is provided with a locking member, which is movably connected to the first plier body or the second plier body through a locking shaft, and the second plier body or the first plier body is provided with a locking aperture, the locking aperture and the locking member being oppositely arranged.

12. The clamping plier according to claim 1, wherein the first handle and the second handle are both provided with an insulating handle.

13. The clamping plier according to claim 1, wherein the elastic member is a torsion spring.

14. The clamping plier according to claim 1, wherein the first cable cutting area and the second cable cutting area are arranged proximate to the shaft, and the first cable stripping area and the second cable stripping area are arranged away from the shaft.

15. The clamping plier according to claim 1, wherein the first cable stripping area and the second cable stripping area are arranged proximate to the shaft, and the first cable cutting area and the second cable cutting area are arranged away from the shaft.

16. The clamping plier according to claim 1, wherein the first cable stripping head is detachably attached to one side of the first crimping head, the second cable stripping head is detachably attached to one side of the second crimping head.

* * * * *